United States Patent [19]

Stickle

[11] Patent Number: 5,743,174
[45] Date of Patent: Apr. 28, 1998

[54] TACO CENTERING APPARATUS

[75] Inventor: John S. Stickle, Plano, Tex.

[73] Assignee: The Double "JJ" Corporation, Dallas, Tex.

[21] Appl. No.: 788,284

[22] Filed: Jan. 24, 1997

[51] Int. Cl.⁶ ................................................ A47J 37/12
[52] U.S. Cl. .................... 99/404; 99/353; 99/427; 99/443 C
[58] Field of Search ..................... 99/427, 431, 403, 99/404–410, 443 R, 443 C, 477–479, 353–355; 198/406, 836.1; 425/394, 412, 452

[56] References Cited

U.S. PATENT DOCUMENTS

| 3,570,393 | 3/1971 | Schy | 99/404 |
|---|---|---|---|
| 3,653,337 | 4/1972 | Hanson | 99/426 |
| 3,667,372 | 6/1972 | Hilvitz et al. | 99/427 X |
| 3,680,474 | 8/1972 | Brown | 99/353 |
| 3,722,400 | 3/1973 | Jimenez | 99/355 X |
| 3,763,764 | 10/1973 | Schy | 99/353 |
| 3,766,846 | 10/1973 | Jimenez | 99/404 X |
| 3,861,289 | 1/1975 | Baker et al. | 99/443 C |
| 3,946,655 | 3/1976 | Schy | 99/407 X |
| 3,948,160 | 4/1976 | Stickle | 99/404 |
| 4,154,153 | 5/1979 | Stickle | 99/404 |
| 4,380,191 | 4/1983 | Gallegos et al. | 99/407 X |
| 4,760,775 | 8/1988 | Hoskins | 198/406 X |

*Primary Examiner*—Timothy F. Simone
*Attorney, Agent, or Firm*—Sidley & Austin

[57] ABSTRACT

A taco frying apparatus (10) is disclosed which permits the tortilla (12) to be trapped between a mesh (30) and a mold (32) to confine the tortilla and create a taco with a uniform u-shape. The mold (32) can pivot between the capture position with a taco captured therebetween and a loading position to allow a tortilla to be placed on the mesh for cooking or to remove the fried taco. Operating lugs (40) on end plates (34, 36) mounted on the mold can be used to pivot the mold.

7 Claims, 5 Drawing Sheets

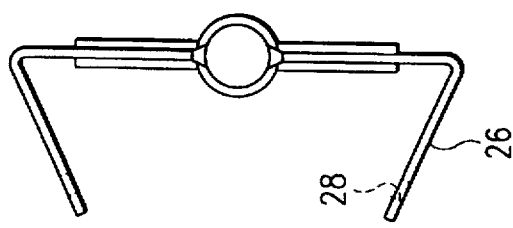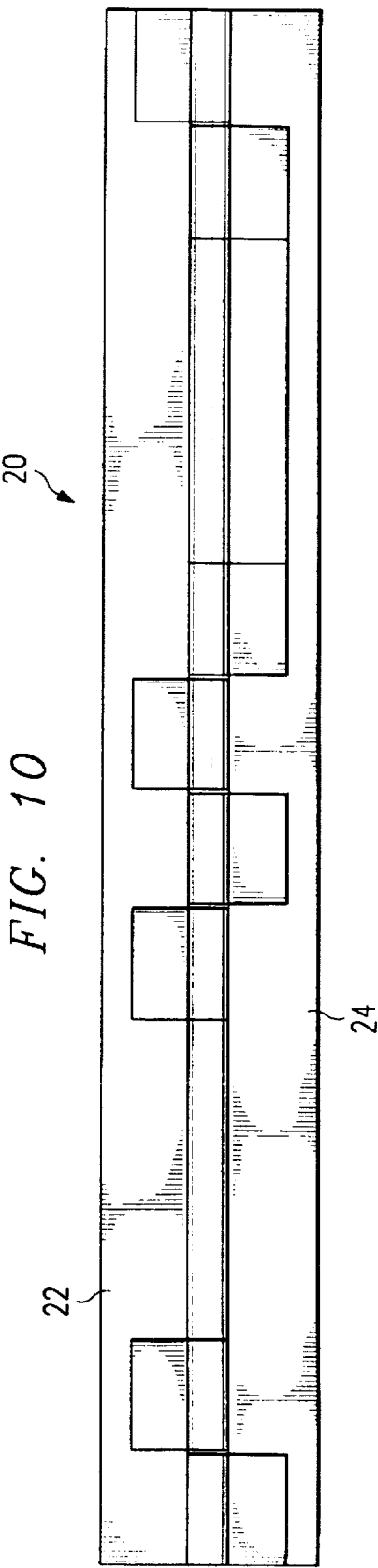

5,743,174

1

TACO CENTERING APPARATUS

TECHNICAL FIELD OF THE INVENTION

This invention relates to an apparatus for frying tacos in a commercial production environment.

BACKGROUND OF THE INVENTION

Tacos are a popular food. Many people buy precooked taco shells from the grocery store and a significant industry exists to produce the taco shells in commercial processes.

Most processes involve placing the baked tortilla in a taco frying machine and passing the taco through a vat of hot oil to fry the taco. A number of mechanisms exist to fry the tacos at commercially acceptable speeds. However, a problem often exists in positioning the tortilla precisely in the machine to form a uniform final product. Non-uniform tacos, commonly known as J's because one leg of the taco is longer than the other, create problems in packaging. The lack of consistency found in commercial products requires a package design which is larger and more bulky than would be necessary if the tacos were more uniformly u-shaped, i.e., the legs of the tacos are of equal length and the tacos are symmetric. This inefficiency costs more in packaging materials and additional shelf space at the stores.

In prior designs, it is common to use a set of four pins to position the tortilla on a wire mesh for frying. Commonly, an 8 inch long mesh is utilized for frying all size tortillas with a diameter less than 8 inches. For example, a standard 5½ inch diameter tortilla would be positioned on the mesh relative to the four pins, working in dual pairs, which rise up from underneath the mesh to about ½ inch above the mesh. Ideally, the forward edge of the tortilla will contact both forward pins so that the forward portion of the tortilla lies between the forward pins and extends ahead of the forward pins. However, in practice, if the tortilla is offset sideways at all, the tortilla will likely only hit one of the forward pins and not be located as forward on the mesh as an ideal position. Also, the tortilla will occasionally drop on the pins and stick to the pins. This has lead to the creation of J's, tacos with one side shorter than the other, and other unacceptable results.

A need therefore exists for an improved taco fryer which will make the product more uniform.

SUMMARY OF THE INVENTION

In accordance with one aspect of the present invention, a taco centering apparatus is provided. The apparatus includes first and second parallel chain elements. First and second rods extend between the first and second chain elements with the first and second rods parallel each other and spaced a predetermined distance along the chain elements from each other. A mesh extends between the first and second rods. A mold is pivotally mounted to the first rod for pivotal motion between a first release position exposing the mesh and a second captured position with the mesh placed over the mold. A tortilla placed on the mesh is positioned and formed as the mesh is placed over the mold.

In accordance with another aspect of the present invention, a hinge is pivotally mounted on the first rod, the hinge having a first hinge half and a second hinge half, the mesh being secured to the first rod through the first hinge half.

In accordance with another aspect of the present invention, the mold has a pivot plate at a first end thereof. The pivot plate is pivoted to the first rod and has an

2 extension therefrom to move the mold between the first and second positions.

BRIEF DESCRIPTION OF THE DRAWINGS

A more complete understanding of the invention and its advantages will be apparent from the following detailed description when taken in conjunction with the accompanied drawings, in which:

FIG. 9 is an end view of the hinge assembly; and

FIG. 10 is a plan view of the hinge assembly.

DETAILED DESCRIPTION

Figure 1:
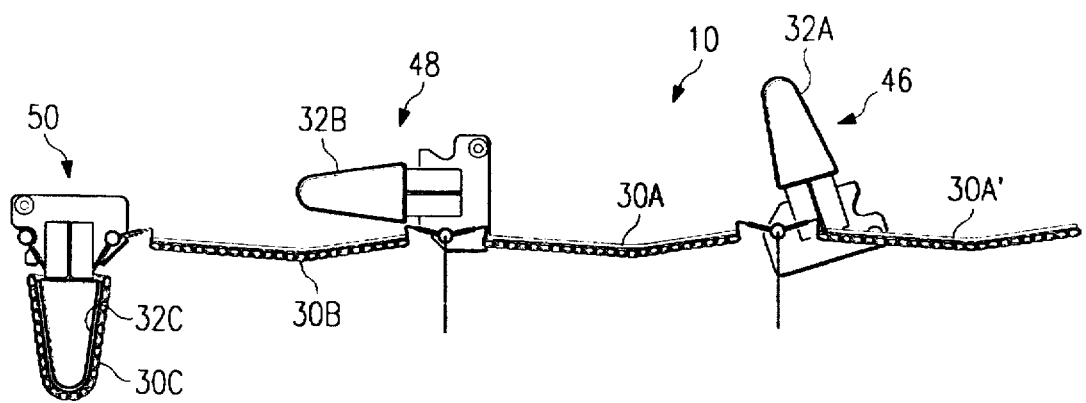
FIG. 1 is a illustrative view of a first embodiment of the present invention.
Figure 8:
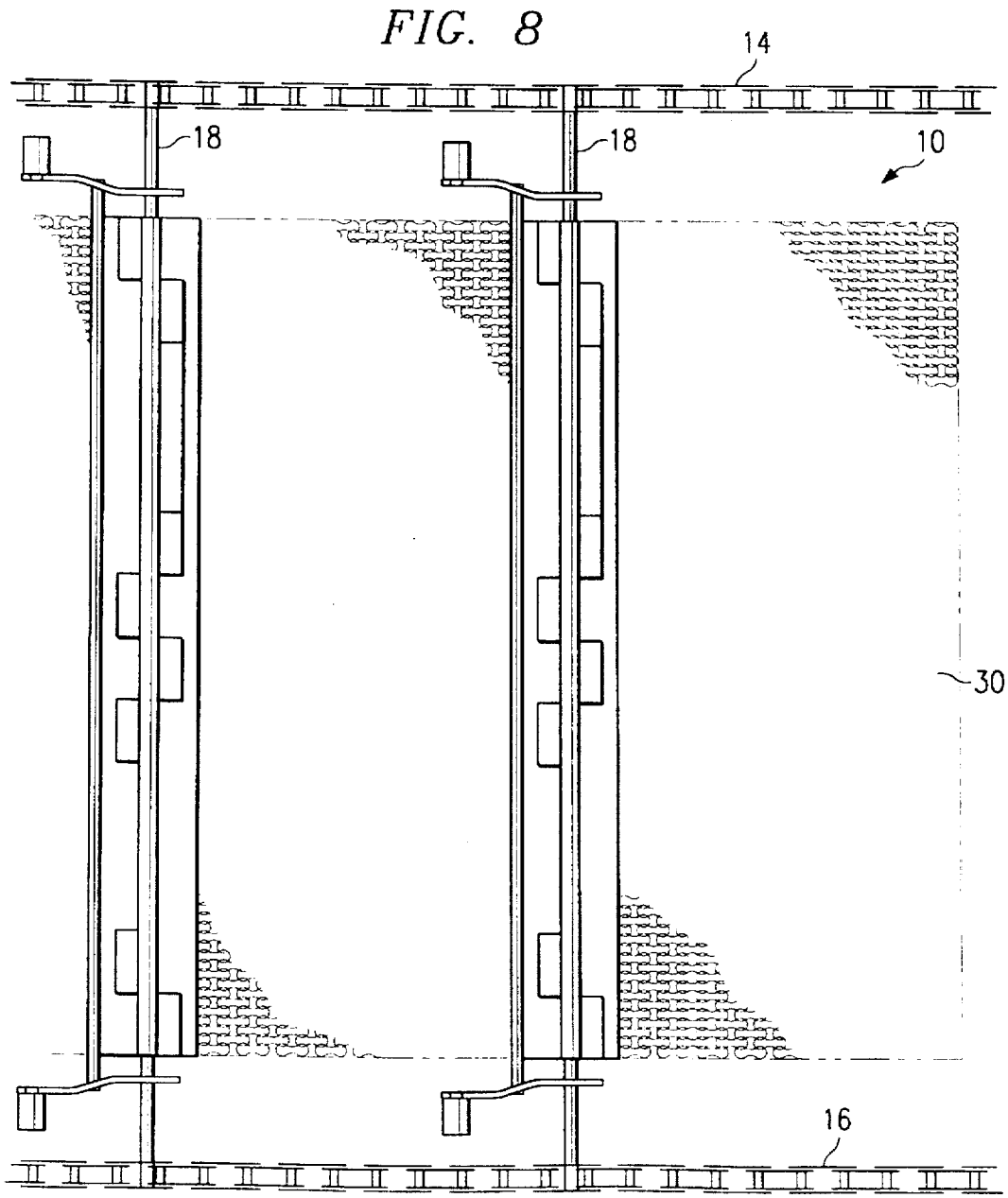
FIG. 8 is a plan view of the embodiment of the present invention.

Referring now to the drawings, wherein like reference characters designate like or corresponding parts throughout the several views, there is shown in FIG. 1 a taco frying apparatus 10 which forms a first embodiment of the present invention. The apparatus 10 is mounted on a taco fryer (not shown) which has a vat of cooking oil which is heated to the desired temperature to cook a taco (tortilla) 12. The taco fryer can be of the type disclosed in U.S. Pat. No. 4,154,153 issued May 15, 1979 to Daniel T. Stickle, which patent is hereby incorporated herein in its entirety. As can be seen in FIG. 8, the apparatus 10 includes a first drive chain 14 and a second drive chain 16 which are mounted on the taco fryer for a continuous cycling motion as is well understood in the industry.

Rods 18 are secured between the drive chains 14 and 16 at spaced intervals so that each of the rods 18 is parallel the others and the spacing is uniform along the entire length of the drive chain. Mounted on each rod 18 is a hinge assembly 20, seen in FIGS. 9 and 10, which includes a first hinge element 22 and a second hinge element 24. The hinge elements 22 and 24 can pivot about the rod 18 on which they are mounted. Each hinge element has a flange 26 with a series of apertures 28 therethrough. The apertures 28 each receive an individual link of a chain mesh 30 that extends between adjacent hinge elements 22 and 24 on rods 18, as best seen in FIGS. 1 and 8. Preferably, the length of the mesh 30 and hinge elements 22 and 24 slightly exceeds the length of the drive chain between the rods so that tension applied to the chains is not carried through the mesh.

Figure 5:
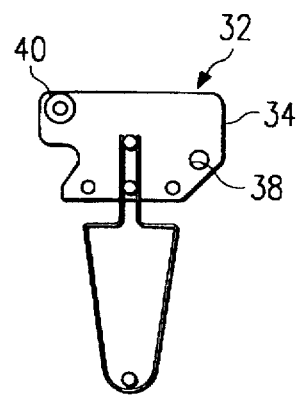
FIG. 5 is a side view of the wire mold.
Figure 6:
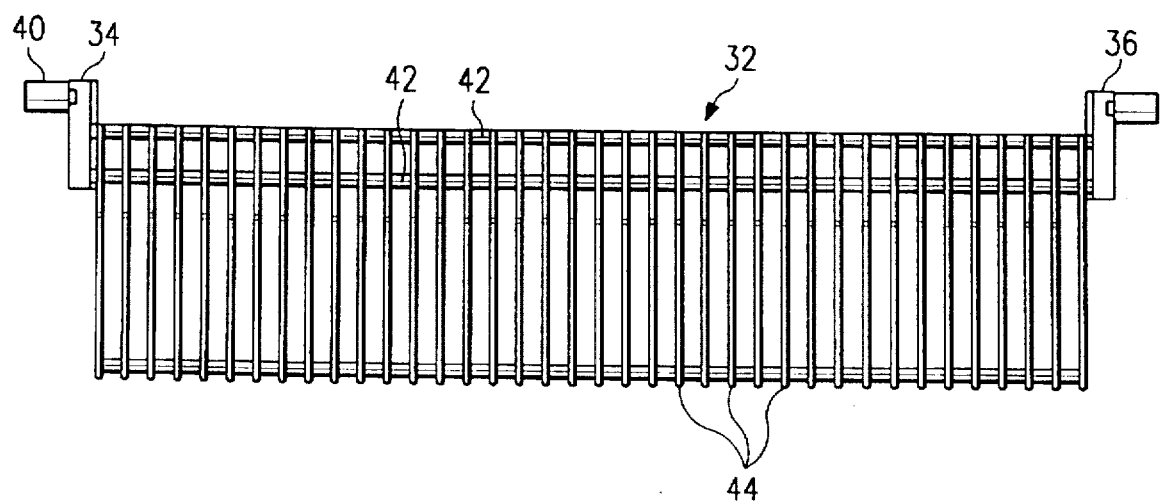
FIG. 6 is a plan view of the wire mold.
Figure 7:
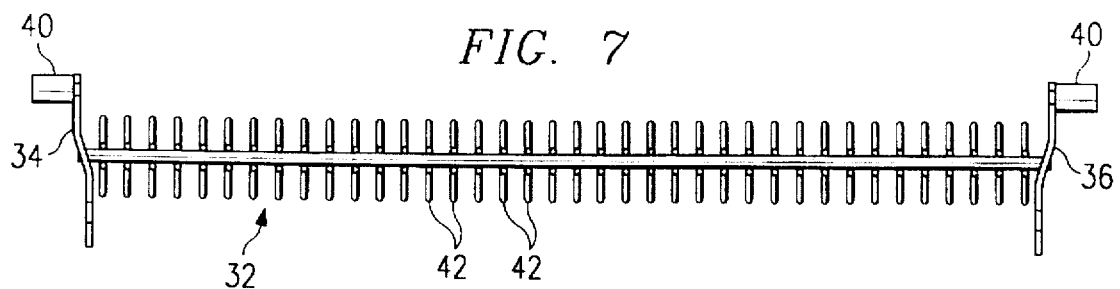
FIG. 7 is a bottom view of the wire mold.

With reference to FIGS. 5–7, a mold 32 is also pivotally mounted on each rod 18. The mold includes end plates 34 and 36, each having an aperture 38 to receive the rods 18. Extending outwardly from each end plate 34 and 36 is an operating lug 40. A pair of transverse wires 42 extend between the end plates 34 and 36 and support a series of mold wires 44 which define a desired external configuration for shaping the taco to be cooked. As shown, the mold wires 44 resemble a Christmas tree in cross-section.

Figure 2:
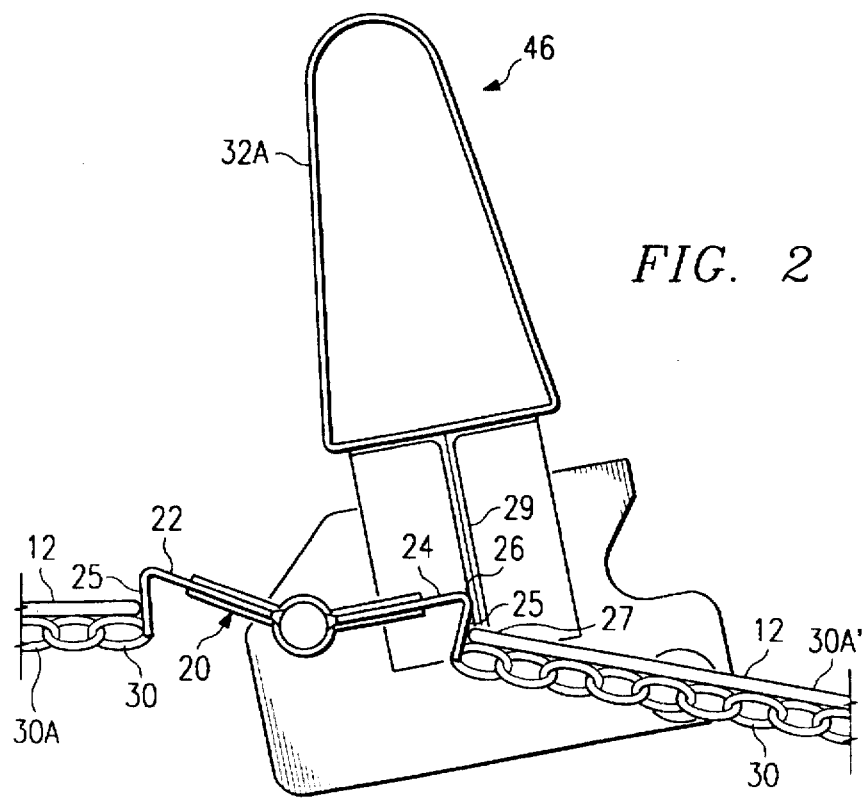
FIG. 2 is a vertical cross-sectional view of the mold in an upright release position and loading position.
Figure 3:
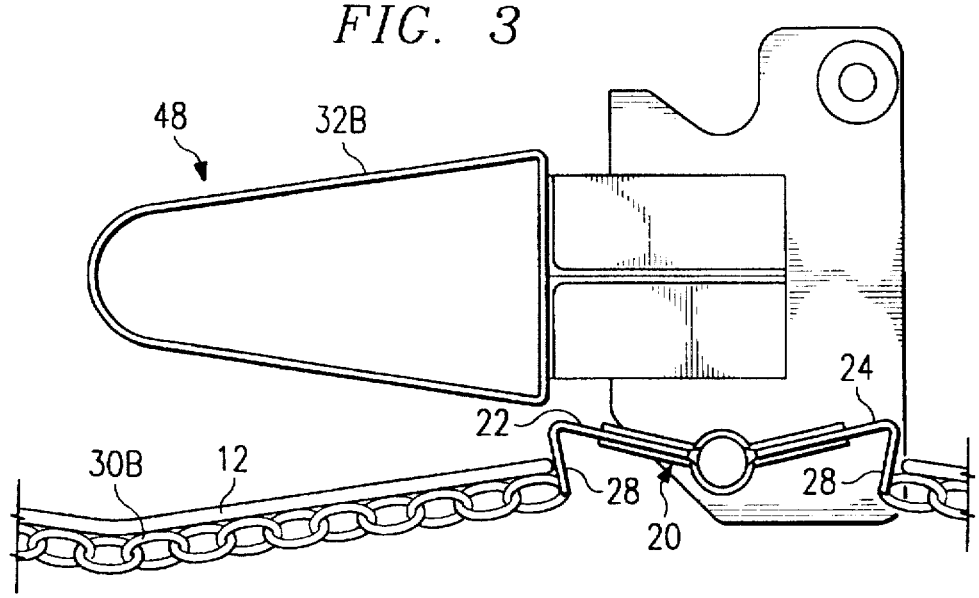
FIG. 3 is a side view of the mold and mesh in the tortilla capture position.
Figure 4:
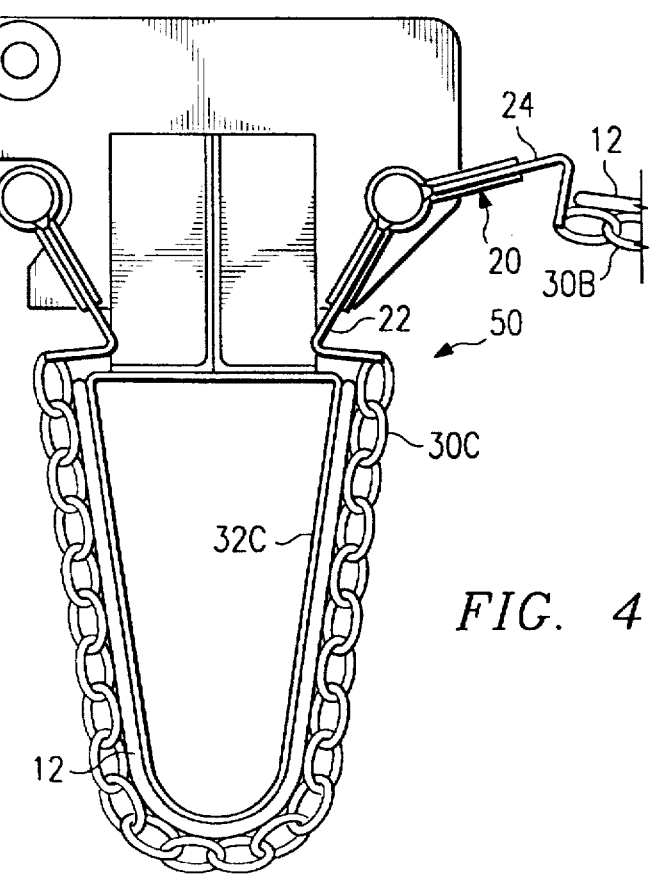
FIG. 4 is a side view showing the mold and mesh moving through the oil tank towards the release position.

With reference to FIGS. 1–4, the operation of the apparatus 10 can be described. In position 46, the operating lug 40 of mold 32A has been operated to pivot the mold 32A into a folding position, as shown, where a tortilla 12 can be laid on the mesh 30A immediately in front of the mold 32A and/or on the mesh 30A' immediately behind the mold 32A. As best seen in FIGS. 1 and 2, the flange 26 of the hinge elements 22 and 24 forms a backstop for the mold 32 in the loading position. The operating lug 40 is then contacted to pivot the mold toward the mesh in front thereof as illustrated by mold 32B moving toward engagement with the mesh 30B at position 48. Finally, the operating lug 40 is further engaged to move the mold 32C into full engagement with the mesh 30C at position 50 to trap the tortilla therebetween and force the taco into the shape determined by the exterior surface profile of the mold wires 44. Simultaneously, the fryer causes the rods 18 to move closer to each other so that the mesh 30C lies against the exterior surface of the mold 32C for the entire length of the mold.

In the configuration of mold 32C and mesh 30C, the taco captured therebetween is moved through the heated oil in the fryer until the taco has been adequately cooked. As the mold and mesh exit the cooking vat, the rods 18 are separated again the full distance permitted by the intervening drive chains and the operating lug 40 is again contacted to pivot the mold into the release position as illustrated by mold 32A. The cooked taco can be permitted to drop from the mold in the release position and packaged for shipment. Alternatively, a positive mechanism can be provided to remove the cooked taco as the mold moves to the release position, if desired.

Because the taco is trapped between the mold and the mesh, vibration and speed in the fryer can be increased without concern for the u-shape tortilla shifting. The resulting taco is also formed into a much more uniform shape which aids in the packaging of the taco. Smaller and more uniform packages can be utilized when the product is more uniform in u-shape, reducing packaging costs and shelf space at the store.

The taco can be positioned on the mesh while the mold is in the loading position either by hand or automatically. Preferably, all of the apparatus 10 is made of stainless steel. It will be expected that each wire mold will be constructed to form a given size taco. If a different sized taco is to be cooked, the size of the wire mold will change to accommodate it.

As seen in FIGS. 1 and 2, the first hinge element 22 and second hinge element 24 have a bent configuration to form a wall 25 which extends upward from the surface of the mesh 30. The wall 25 extends the entire width of the mesh. When a tortilla is dropped onto the mesh, the forward edge 27 of the tortilla will come in contact with the wall 25 of the second hinge element 24. The lateral position of the tortilla across the width of the mesh is not critical as the wall 25 extends the entire width of the mesh. Therefore, the tortilla is more accurately positioned relative the mesh than was possible with the prior design utilizing a pair of pins for positioning. The back edge of the tortilla could also come in contact with the wall 25 of the second hinge element 22. The wall 25 preferably extends about ½ inch above the mesh 30. This design more accurately positions the tortilla on the mesh and reduces the possibility of defective J's being formed. Also, the elimination of the positioning pins prevent the tortilla from being stuck to the pins during frying. As a further advantage, the trunk portion 29 of the wire molds 32 also provides a stop for the tortilla. The trunk portion preferably extends about 1 inch above the mesh.

Although a single embodiment of the present invention has been illustrated in the accompanying drawings and described in the foregoing detailed description, it will be understood that the invention is not limited to the embodiment disclosed, but is capable of numerous rearrangements, modifications and substitutions of parts and elements without departing from the scope or spirit of the invention.

I claim:

1. A taco frying apparatus, comprising:
   first and second parallel chain elements;
   first and second rods extending between said first and second chain elements, the first and second rods parallel each other and spaced a predetermined distance along the chain elements from each other;
   a mesh extending between the first and second rods; and
   a mold pivotally mounted to said first rod for pivotal motion between a first release position exposing the mesh and a second capture position with the mesh formed over the mold.

2. The taco frying apparatus of claim 1, wherein a hinge assembly is pivotally mounted to the first rod for pivotal motion, the hinge assembly including a first hinge element and a second hinge element.

3. The taco frying apparatus of claim 2, wherein the mesh is attached to the hinge assembly.

4. The taco frying apparatus of claim 1, further comprising an end plate at a first end of the mold, the end plate pivoted to the first rod, the end plate having an operating lug extending therefrom to move the mold between the release position and the capture position.

5. The taco frying apparatus of claim 1, wherein the mold is formed of a series of wire molds.

6. The taco frying apparatus of claim 1, wherein a first end plate is mounted at a first end of the mold and a second end plate is mounted at a second end of the mold, the end plates each having apertures therethrough for passage of the first rod to permit the mold to pivot about the first rod.

7. The taco frying apparatus of claim 2, wherein the first and second hinge elements each contain a flange, the flange having apertures therein to receive individual loops of the mesh.

\* \* \* \* \*